US006922773B2

(12) United States Patent
Faraboschi et al.

(10) Patent No.: US 6,922,773 B2
(45) Date of Patent: Jul. 26, 2005

(54) SYSTEM AND METHOD FOR ENCODING CONSTANT OPERANDS IN A WIDE ISSUE PROCESSOR (75) Inventors: Paolo Faraboschi, Brighton, MA (US); Alexander J. Starr, Acton, MA (US); Anthony X. Jarvis, Acton, MA (US); Geoffrey M. Brown, Watertown, MA (US); Mark Owen Homewood, Winscombe (GB); Gary L. Vondran, San Carlos, CA (US)

(73) Assignees: STMicroelectronics, Inc., Carrollton, TX (US); Hewlett-Packard Company, Palo Alto, CA (US)

( * ) Notice: Subject to any disclaimer, the term of this patent is extended or adjusted under 35 U.S.C. 154(b) by 737 days.

(21) Appl. No.: 09/751,408

(22) Filed: Dec. 29, 2000

(65) Prior Publication Data

US 2002/0087834 A1 Jul. 4, 2002

(51) Int. Cl.[7] .................................................. G06F 9/34
(52) U.S. Cl. .......................................... 712/221; 712/24
(58) Field of Search .................................. 712/24, 221

(56) References Cited

U.S. PATENT DOCUMENTS 4,109,310 A * 8/1978 England et al. ............. 712/243
4,595,911 A * 6/1986 Kregness et al. ............. 341/78
6,006,324 A * 12/1999 Tran et al. ................... 712/204
6,173,305 B1 * 1/2001 Poland ........................ 708/650
6,282,633 B1 * 8/2001 Killian et al. ................ 712/208

* cited by examiner

Primary Examiner—Eric Coleman
(74) Attorney, Agent, or Firm—Lisa K. Jorgenson; William A. Munck (57) ABSTRACT For use in a data processor comprising an instruction execution pipeline comprising N processing stages, a system and method of encoding constant operands is disclosed. The system comprises a constant generator unit that is capable of generating both short constant operands and long constant operands. The constant generator unit extracts the bits of a short constant operand from an instruction syllable and right justifies the bits in an output syllable. For long constant operands, the constant generator unit extracts K low order bits from an instruction syllable and T high order bits from an extension syllable. The right justified K low order bits and the T high order bits are combined to represent the long constant operand in one output syllable. In response to the status of op code bits located within a constant generation instruction, the constant generator unit enables and disables multiplexers to automatically generate the appropriate short or long constant operand.

20 Claims, 6 Drawing Sheets

SYSTEM AND METHOD FOR ENCODING CONSTANT OPERANDS IN A WIDE ISSUE PROCESSOR

CROSS-REFERENCE TO RELATED APPLICATIONS

The present invention is related to those disclosed in the following United States Patent Applications:

1) Ser. No. 09/751,372, filed concurrently herewith, entitled "SYSTEM AND METHOD FOR EXECUTING VARIABLE LATENCY LOAD OPERATIONS IN A DATA PROCESSOR";
2) Ser. No. 09/751,331 now U.S. Pat. No. 6,865,665, filed concurrently herewith, entitled "PROCESSOR PIPELINE STALL APPARATUS AND METHOD OF OPERATION";
3) Ser. No. 09/751,371 now U.S. Pat. No. 6,691,210, filed concurrently herewith, entitled "CIRCUIT AND METHOD FOR HARDWARE-ASSISTED SOFTWARE FLUSHING OF DATA AND INSTRUCTION CACHES";
4) Ser. No. 09/751,327 now U.S. Pat. No. 6,829,700, filed concurrently herewith, entitled "CIRCUIT AND METHOD FOR SUPPORTING MISALIGNED ACCESSES IN THE PRESENCE OF SPECULATIVE LOAD INSTRUCTIONS";
5) Ser. No. 09/751,377, filed concurrently herewith, entitled "BYPASS CIRCUITRY FOR USE IN A PIPELINED PROCESSOR";
6) Ser. No. 09/751,410, filed concurrently herewith, entitled "SYSTEM AND METHOD FOR EXECUTING CONDITIONAL BRANCH INSTRUCTIONS IN A DATA PROCESSOR";
7) Ser. No. 09/751,330 now U.S. Pat. No. 6,807,628, filed concurrently herewith, entitled "SYSTEM AND METHOD FOR SUPPORTING PRECISE EXCEPTIONS IN A DATA PROCESSOR HAVING A CLUSTERED ARCHITECTURE";
8) Ser. No. 09/751,674, filed concurrently herewith, entitled "CIRCUIT AND METHOD FOR INSTRUCTION COMPRESSION AND DISPERSAL IN WIDE-ISSUE PROCESSORS";
9) Ser. No. 09/751,678 now U.S. Pat. No. 6,772,355, filed concurrently herewith, entitled "SYSTEM AND METHOD FOR REDUCING POWER CONSUMPTION IN A DATA PROCESSOR HAVING A CLUSTERED ARCHITECTURE"; and
10) Ser. No. 09/751,679, filed concurrently herewith, entitled "INSTRUCTION FETCH APPARATUS FOR WIDE ISSUE PROCESSORS AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to data processors and, more specifically, to a system for encoding constant operands in a wide-issue data processor.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of an N-stage pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution rate advantage that a pipelined processor has over a non-pipelined processor.

An exemplary seven stage processor pipeline may consist of an address generation stage, an instruction fetch stage, a decode stage, a read stage, a pair of execution (E1 and E2) stages, and a write (or write-back) stage. In addition, the processor may have an instruction cache that stores program instructions for execution, a data cache that temporarily stores data operands that otherwise are stored in processor memory, and a register file that also temporarily stores data operands.

The address generation stage generates the address of the next instruction to be fetched from the instruction cache. The instruction fetch stage fetches an instruction for execution from the instruction cache and stores the fetched instruction in an instruction buffer. The decode stage takes the instruction from the instruction buffer and decodes the instruction into a set of signals that can be directly used for executing subsequent pipeline stages. The read stage fetches required operands from the data cache or registers in the register file. The E1 and E2 stages perform the actual program operation (e.g., add, multiply, divide, and the like) on the operands fetched by the read stage and generates the result. The write stage then writes the result generated by the E1 and E2 stages back into the data cache or the register file.

Assuming that each pipeline stage completes its operation in one clock cycle, the exemplary seven stage processor pipeline takes seven clock cycles to process one instruction. As previously described, once the pipeline is full, an instruction can theoretically be completed every clock cycle.

The throughput of a processor also is affected by the size of the instruction set executed by the processor and the resulting complexity of the instruction decoder. Large instruction sets require large, complex decoders in order to maintain a high processor throughput. However, large complex decoders tend to increase power dissipation, die size and the cost of the processor. The throughput of a processor also may be affected by other factors, such as exception handling, data and instruction cache sizes, multiple parallel instruction pipelines, and the like. All of these factors increase or at least maintain processor throughput by means of complex and/or redundant circuitry that simultaneously increases power dissipation, die size and cost.

In many processor applications, the increased cost, increased power dissipation, and increased die size are tolerable, such as in personal computers and network servers that use x86-based processors. These types of processors include, for example, Intel Pentium™ processors and AMD Athlon™ processors. However, in many applications it is essential to minimize the size, cost, and power requirements of a data processor. This has led to the development of processors that are optimized to meet particular size, cost and/or power limits. For example, the recently developed Transmeta Crusoe™ processor greatly reduces the amount of power consumed by the processor when executing most x86 based programs. This is particularly useful in laptop computer applications. Other types of data processors may be optimized for use in consumer appliances (e.g., televisions, video players, radios, digital music players, and the like) and office equipment (e.g., printers, copiers, fax machines, telephone systems, and other peripheral devices).

In general, an important design objective for data processors used in consumer appliances and office equipment is the minimization of cost and complexity of the data processor. One important function that can impact the size, complexity, cost and throughput of a data processor is the function of encoding computer instructions. Often the value of a constant must be encoded for use as an operand in a computer instruction. Small size constants may be encoded within a single computer word. For example, signed integers from minus 256 up to plus 255 can be encoded using nine (9) bits. Large size constants require significantly more bits. Therefore large size constants require more than one computer word in a computer instruction that encodes a large size constant as an operand.

In order to minimize the amount of memory space required to encode computer instructions, it is common for data processors to provide two or more formats (i.e., data sizes) for encoding constants as operands. One prior art approach to providing multiple data sizes is to use a variable length instruction encoding method. In this prior art method the length of the instruction (and therefore the size of any incorporated constant data) can only be determined by decoding one or more instruction format fields. For example, the Intel x86 family of processors has instructions that incorporate one, two, or four bytes of constant data. The length of the constant data is only determined after the first byte of the instruction has been read and decoded. The decoding process in this case is inherently serial. However, by speculatively reading instruction data, the process can be performed in parallel. The major disadvantage of a variable length encoding method is that the complexity of the decoding.

A second prior art method provides different data sizes encoded in a fixed length instruction. For example, Hewlett Packard PA-RISC processors have multiple possible constant data fields depending upon the format of a given instruction. However, this method has no way to directly encode a constant having a length of one word. A similar structure is provided in the IA-64 processor together with a "move long immediate" instruction. The "move long immediate" instruction allows the processor to load a register with a long constant without a cycle penalty by borrowing an extension syllable. The major disadvantage of this method is that a "move long immediate" instruction usually involves one (or more) extra operations and an additional cycle penalty.

Therefore, there is a need in the art for an improved system and method for encoding constant operands in data processors. In particular, there is a need in the art for an improved system and method for encoding constant operands in wide issue data processors.

SUMMARY OF THE INVENTION

To address the above-discussed deficiencies of the prior art, it is a primary object of the present invention to provide a wide issue data processor that is capable of efficiently encoding constant operands.

The system of the present invention generally comprises a constant generator unit that is capable of generating both short constant operands and long constant operands. The constant generator unit extracts the bits of a short constant operand from an instruction syllable and right justifies the bits in an output syllable. For long constant operands, the constant generator unit extracts K low order bits from an instruction syllable and T high order bits from an extension syllable. The right justified K low order bits and the T high order bits are combined to represent the long constant operand in one output syllable. In response to the status of op code bits located within a constant generation instruction, the constant generator unit enables and disables multiplexers to automatically generate the appropriate short or long constant operand.

It is an object of the present invention to provide a system and method for generating a short constant operand by decoding at least one constant operand instruction containing a K bit constant field containing K bits that represent a short constant operand.

It is another object of the present invention to provide a system and method for generating a short constant operand by using a sign extender unit to select and right justify in an output syllable K bits that represent the short constant operand.

It is yet another object of the present invention to provide a system and method for generating a long constant operand by receiving T bits that represent the high order bits of the long constant operand and K bits that represent the low order bits of the long constant operand, and by combining the T bits and the K bits to generate the long constant operand.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 12, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
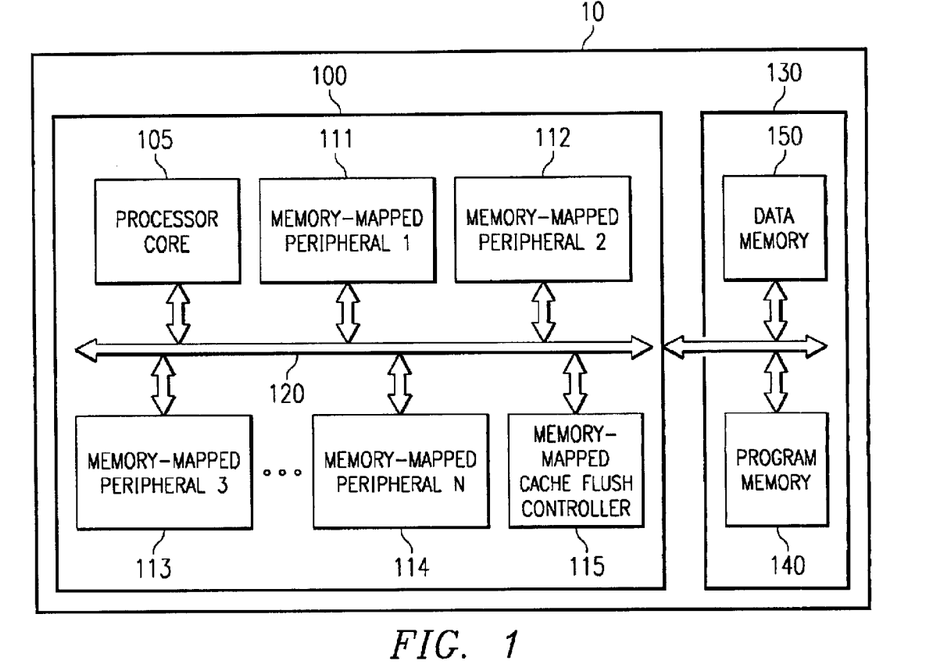
FIG. 1 is a block diagram of a processing system that contains a data processor in accordance with the principles of the present invention.

FIG. 1 is a block diagram of processing system 10, which contains data processor 100 in accordance with the principles of the present invention. Data processor 100 comprises processor core 105 and N memory-mapped peripherals interconnected by system bus 120. The N memory-mapped peripherals include exemplary memory-mapped peripherals 111–114, which are arbitrarily labeled Memory-Mapped Peripheral 1, Memory-Mapped Peripheral 2, Memory-Mapped Peripheral 3, and Memory-Mapped Peripheral N. Processing system 10 also comprises main memory 130. In an advantageous embodiment of the present invention, main memory 130 may be subdivided into program memory 140 and data memory 150.

The cost and complexity of data processor 100 is minimized by excluding from processor core 105 complex functions that may be implemented by one or more of memory-mapped peripherals 111–114. For example, memory-mapped peripheral 111 may be a video codec and memory-mapped peripheral 112 may be an audio codec. Similarly, memory-mapped peripheral 113 may be used to control cache flushing. The cost and complexity of data processor 100 is further minimized by implementing extremely simple exception behavior in processor core 105, as explained below in greater detail.

Processing system 10 is shown in a general level of detail because it is intended to represent any one of a wide variety of electronic devices, particularly consumer appliances. For example, processing system 10 may be a printer rendering system for use in a conventional laser printer. Processing system 10 also may represent selected portions of the video and audio compression-decompression circuitry of a video playback system, such as a video cassette recorder or a digital versatile disk (DVD) player. In another alternative embodiment, processing system 10 may comprise selected portions of a cable television set-top box or a stereo receiver. The memory-mapped peripherals and a simplified processor core reduce the cost of data processor 100 so that it may be used in such price sensitive consumer appliances.

In the illustrated embodiment, memory-mapped peripherals 111–114 are shown disposed within data processor 100 and program memory 140 and data memory 150 are shown external to data processor 100. It will be appreciated by those skilled in the art that this particular configuration is shown by way of illustration only and should not be construed so as to limit the scope of the present invention in any way. In alternative embodiments of the present invention, one or more of memory-mapped peripherals 111–114 may be externally coupled to data processor 100. Similarly, in another embodiment of the present invention, one or both of program memory 140 and data memory 150 may be disposed on-chip in data processor 100.

Figure 2:
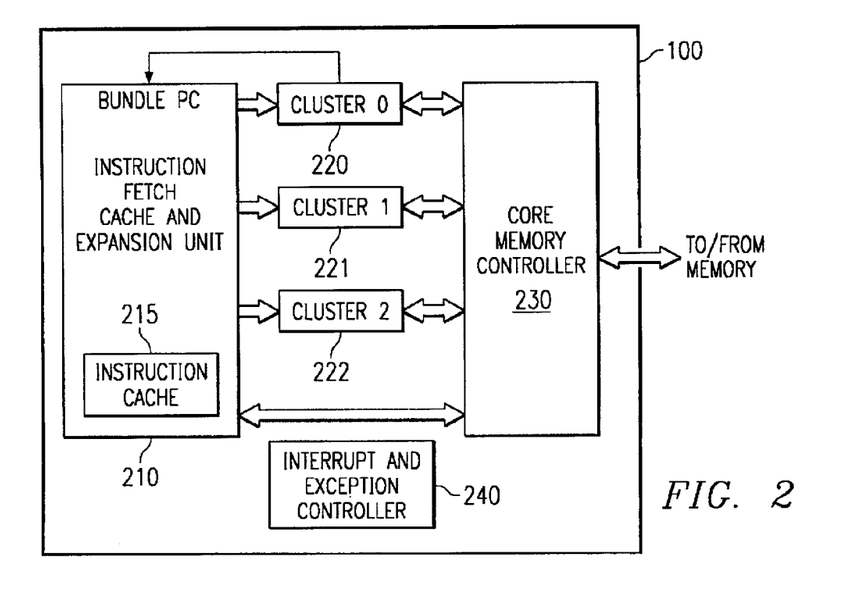
FIG. 2 illustrates the exemplary data processor in greater detail according to one embodiment of the present invention.

FIG. 2 is a more detailed block diagram of exemplary data processor 100 according to one embodiment of the present invention. Data processor 100 comprises instruction fetch cache and expansion unit (IFCEXU) 210, which contains instruction cache 215, and a plurality of clusters, including exemplary clusters 220–222. Exemplary clusters 220–222 are labeled Cluster 0, Cluster 1 and Cluster 2, respectively. Data processor 100 also comprises core memory controller 230 and interrupt and exception controller 240.

A fundamental object of the design of data processor 100 is to exclude from the core of data processor 100 most of the functions that can be implemented using memory-mapped peripherals external to the core of data processor 100. By way of example, in an exemplary embodiment of the present invention, cache flushing may be efficiently accomplished using software in conjunction with a small memory-mapped device. Another object of the design of data processor 100 is to implement a statically scheduled instruction pipeline with an extremely simple exception behavior.

Clusters 220–222 are basic execution units that comprise one or more arithmetic units, a register file, an interface to core memory controller 230, including a data cache, and an inter-cluster communication interface. In an exemplary embodiment of the present invention, the core of data processor 100 may comprise only a single cluster, such as exemplary cluster 220.

Because conventional processor cores can execute multiple simultaneously issued operations, the traditional word "instruction" is hereby defined with greater specificity. For the purposes of this disclosure, the following terminology is adopted. An "instruction" or "instruction bundle" is a group of simultaneously issued operations encoded as "instruction syllables". Each instruction syllable is encoded as a single machine word. Each of the operations constituting an instruction bundle may be encoded as one or more instruction syllables. Hereafter, the present disclosure may use the shortened forms "instruction" and "bundle" interchangeably and may use the shortened form "syllable." In an exemplary embodiment of the present invention, each instruction bundle consists of 1 to 4 instruction syllables. Flow control operations, such as branch or call, are encoded in single instruction syllables.

Figure 3:
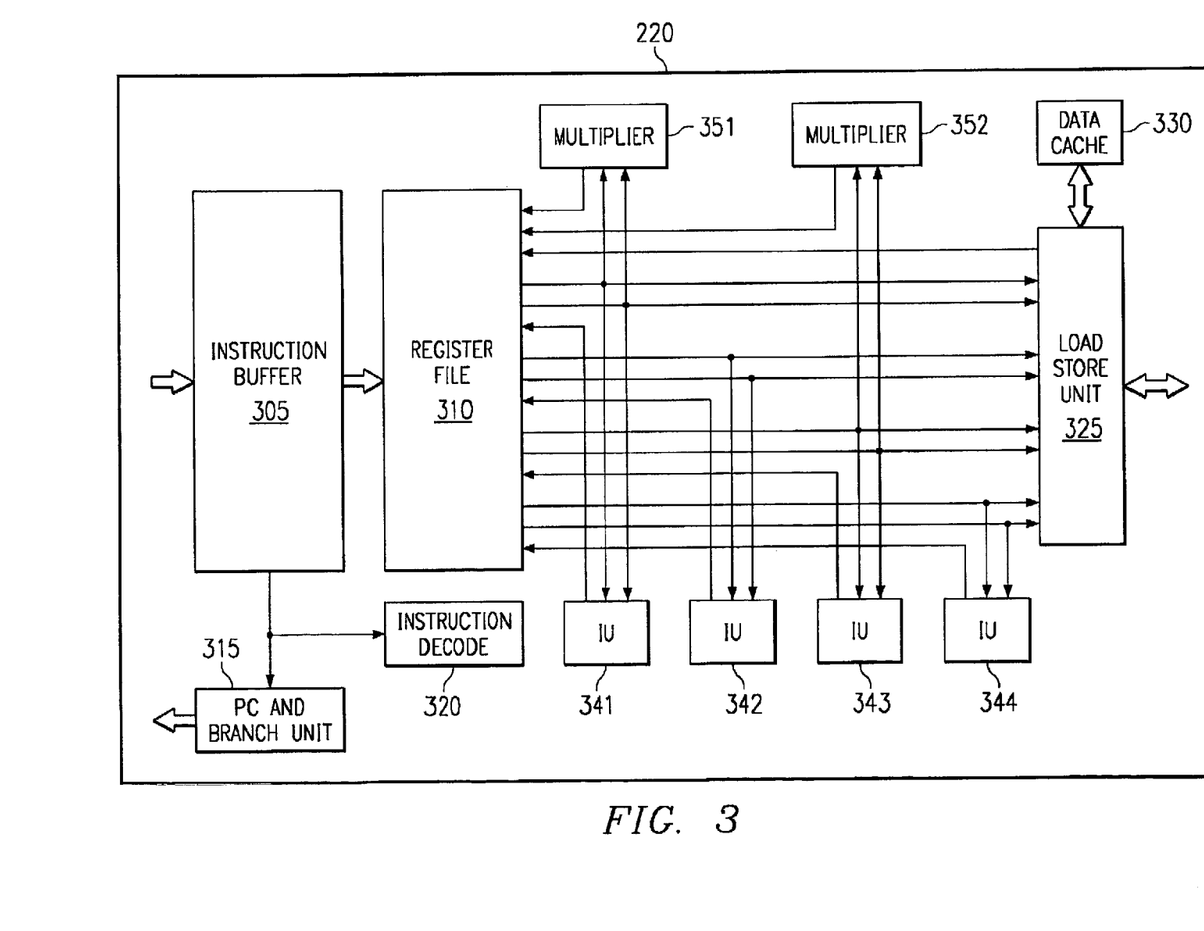
FIG. 3 illustrates a cluster in the exemplary data processor according to one embodiment of the present invention.

FIG. 3 is a more detailed block diagram of cluster 220 in data processor 100 according to one embodiment of the present invention. Cluster 220 comprises instruction buffer 305, register file 310, program counter (PC) and branch unit 315, instruction decoder 320, load store unit 325, data cache 330, integer units 341–344, and multipliers 351–352. Cluster 220 is implemented as an instruction pipeline.

Instructions are issued to an operand read stage associated with register file 310 and then propagated to the execution units (i.e., integer units 341–244, multipliers 351–352). Cluster 220 accepts one bundle comprising one to four syllables in each cycle. The bundle may consist of any combination of four integer operations, two multiplication operations, one memory operation (i.e., read or write) and one branch operation. Operations that require long constants require two syllables.

In specifying a cluster, it is assumed that no instruction bits are used to associate operations with functional units. For example, arithmetic or load/store operations may be placed in any of the four words encoding the operations for a single cycle. This may require imposing some addressing alignment restrictions on multiply operations and long constants.

This following describes the architectural (programmer visible) status of the core of data processor 100. One design objective of data processor 100 is to minimize the architectural status. All non-user visible status information resides in a memory map, in order to reduce the number of special instructions required to access such information.

Program Counter

In an exemplary embodiment of the present invention, the program counter (PC) in program counter and branch unit 315 is a 32-bit byte address pointing to the beginning of the current instruction bundle in memory. The two least significant bits (LSBs) of the program counter are always zero. In operations that assign a value to the program counter, the two LSBs of the assigned value are ignored.

Register File 310

In an exemplary embodiment, register file 310 contains 64 words of 32 bits each. Reading Register 0 (i.e., R0) always returns the value zero.

Link Register

Register 63 (i.e., R63) is used to address the link register by the call and return instructions. The link register (LR) is a slaved copy of the architecturally most recent update to R63. R63 can be used as a normal register, between call and return instructions. The link register is updated only by writes to R63 and the call instruction. At times the fact that the link register is a copy of R63 and not R63 itself may be visible to the programmer. This is because the link register and R63 get updated at different times in the pipeline. Typically, this occurs in the following cases:

1) ICALL and IGOTO instructions—Since these instructions are executed in the decode stage, these operations require that R63 be stable. Thus, R63 must not be modified in the instruction bundle preceding one of these operations. Otherwise unpredictable results may occur in the event of an interrupt; and 2) An interrupt or exception may update the link register incorrectly. Thus, all interrupt and exception handlers must explicitly write R63 prior to using the link register through the execution of an RFI, ICALL or IGOTO instruction. This requirement can be met with a simple MOV instruction from R63 to R63.

Branch Bit File

The branch architecture of data processor 100 uses a set of eight (8) branch bit registers (i.e., B0 through B7) that may be read or written independently. In an exemplary embodiment of the present invention, data processor 100 requires at least one instruction to be executed between writing a branch bit and using the result in a conditional branch operation.

Control Registers

A small number of memory mapped control registers are part of the architectural state of data processor 100. These registers include support for interrupts and exceptions, and memory protection.

The core of data processor 100 is implemented as a pipeline that requires minimal instruction decoding in the early pipeline stages. One design objective of the pipeline of data processor 100 is that it support precise interrupts and exceptions. Data processor 100 meets this objective by updating architecturally visible state information only during a single write stage. To accomplish this, data processor 100 makes extensive use of register bypassing circuitry to minimize the performance impact of meeting this requirement.

Figure 4:
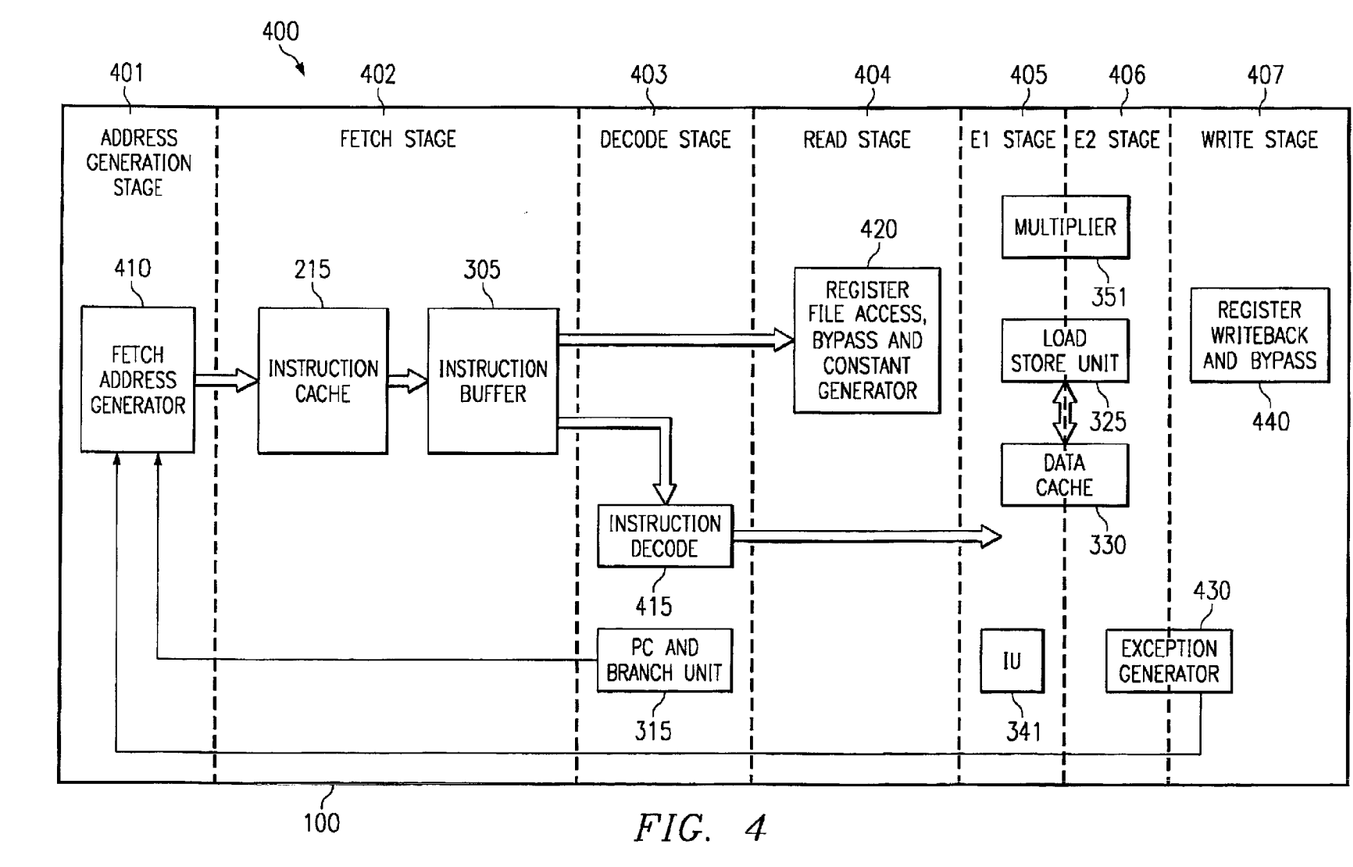
FIG. 4 illustrates the operational stages of the exemplary data processor according to one embodiment of the present invention.

FIG. 4 is a block diagram illustrating the operational stages of pipeline 400 in exemplary data processor 100 according to one embodiment of the present invention. In the illustrated embodiment, the operational stages of data processor 100 are address generation stage 401, fetch stage 402, decode stage 403, read stage 404, first execution (E1) stage 405, second execution (E2) stage 406 and write stage 407.

Address Generation Stage 401 and Fetch Stage 402

Address generation stage 401 comprises a fetch address generator 410 that generates the address of the next instruction to be fetched from instruction cache 215. Fetch address generator 410 receives inputs from exception generator 430 and program counter and branch unit 315. Fetch address generator 410 generates an instruction fetch address (FADDR) that is applied to instruction cache 215 in fetch stage 402 and to an instruction protection unit (not shown) that generates an exception if a protection violation is found. Any exception generated in fetch stage 402 is postponed to write stage 407. Instruction buffer 305 in fetch stage 402 receives instructions as 128-bit wide words from instruction cache 215 and the instructions are dispatched to the cluster.

Decode Stage 403

Decode stage 403 comprises instruction decode block 415 and program counter (PC) and branch unit 315. Instruction decode block 415 receives instructions from instruction buffer 305 and decodes the instructions into a group of control signals that are applied to the execution units in E1 stage 405 and E2 stage 406. Program counter and branch unit 315 evaluates branches detected within the 128-bit wide words. A taken branch incurs a one cycle delay and the instruction being incorrectly fetched while the branch instruction is evaluated is discarded.

Read Stage 404

In read stage 404, operands are generated by register file access, bypass and constant generation block 420. The sources for operands are the register files, the constants assembled from the instruction bundle, and any results bypassed from operations in later stages in the instruction pipeline.

E1 Stage 405 and E2 Stage 406

The instruction execution phase of data processor 100 is implemented as two stages, E1 stage 405 and E2 stage 406 to allow two cycle cache access operations and two cycle multiplication operations. Exemplary multiplier 351 is illustrated straddling the boundary between E1 stage 405 and E2 stage 406 to indicate a two cycle multiplication operation. Similarly, load store unit 325 and data cache 330 are illustrated straddling the boundary between E1 stage 405 and E2 stage 406 to indicate a two cycle cache access operation. Integer operations are performed by integer units, such as IU 341 in E1 stage 405. Exceptions are generated by exception generator 430 in E2 stage 406 and write stage 407.

Results from fast operations are made available after E1 stage 405 through register bypassing operations. An important architectural requirement of data processor 100 is that if the results of an operation may be ready after E1 stage 405, then the results are always ready after E1 stage 405. In this manner, the visible latency of operations in data processor 100 is fixed.

Write Stage 407

At the start of write stage 407, any pending exceptions are raised and, if no exception is raised, results are written by register write back and bypass block 440 into the appropriate register file and/or data cache location. In data processor 100, write stage 407 is the "commit point" and operations reaching write stage 407 in the instruction pipeline and not "excepted" are considered completed. Previous stages (i.e., address generation, fetch, decode, read, E1, E2) are temporally prior to the commit point. Therefore, operations in address fetch stage 401, fetch stage 402, decode stage 403, read stage 404, E1 stage 405 and E2 stage 406 are flushed when an exception occurs and are acted upon in write stage 407.

As the above description indicates, data processor 100 is a very large instruction word (VLIW) device that allows the parallel execution of multiple instructions in two or more instruction pipelines in clusters 220–222. In an exemplary embodiment, instruction cache 215 comprises cache lines that are five hundred twelve (512) bits (i.e., sixty four (64) bytes) long. Each syllable (i.e., smallest instruction size) comprises thirty two (32) bits (i.e., four (4) bytes), such that a cache line comprises sixteen (16) syllables. Each instruction syllable is encoded as a single 32-bit machine word.

Instructions are fetched from instruction cache 215 in groups of four syllables (i.e., one hundred twenty eight (128) bits). A complete instruction may comprise, one, two, three or four syllables. The fetched syllables are issued into one of four issues lanes leading into the instruction pipeline. The four issue lanes are referred to as Issue Lane 0, Issue Lane 1, Issue Lane 2, and Issue Lane 3.

Encoding Constant Operands

The present invention is directed toward an improved system and method for encoding constant operands in computer instructions. The present invention may be advantageously used in a wide issue processor. The term "constant" refers to a fixed, unchanging numerical value.

In order to minimize the memory space required to encode instructions, it common for processors to provide two or more formats for encoding constant operands in instructions. Accordingly, an embodiment of the present invention will be described that provides a short constant data size and a long constant data size. It is noted that the present invention is not limited to the two sizes of the exemplary embodiment. Alternate embodiments of the present invention may be designed that use more than two sizes for constant data.

The present invention provides an efficient system and method for encoding both short constant operands and long constant operands. Unlike prior art methods, the present invention does not require separate encoding operations or additional cycles. The present invention uses positional encoding to handle the additional information that is necessary to encode long constant operands. The positional encoding of the present invention reduces the overhead of extra encoding bits that would otherwise be necessary to encode long constant operands. As will be more fully described, the positional encoding feature of the present invention is provided by a constant generator unit.

Figure 5:
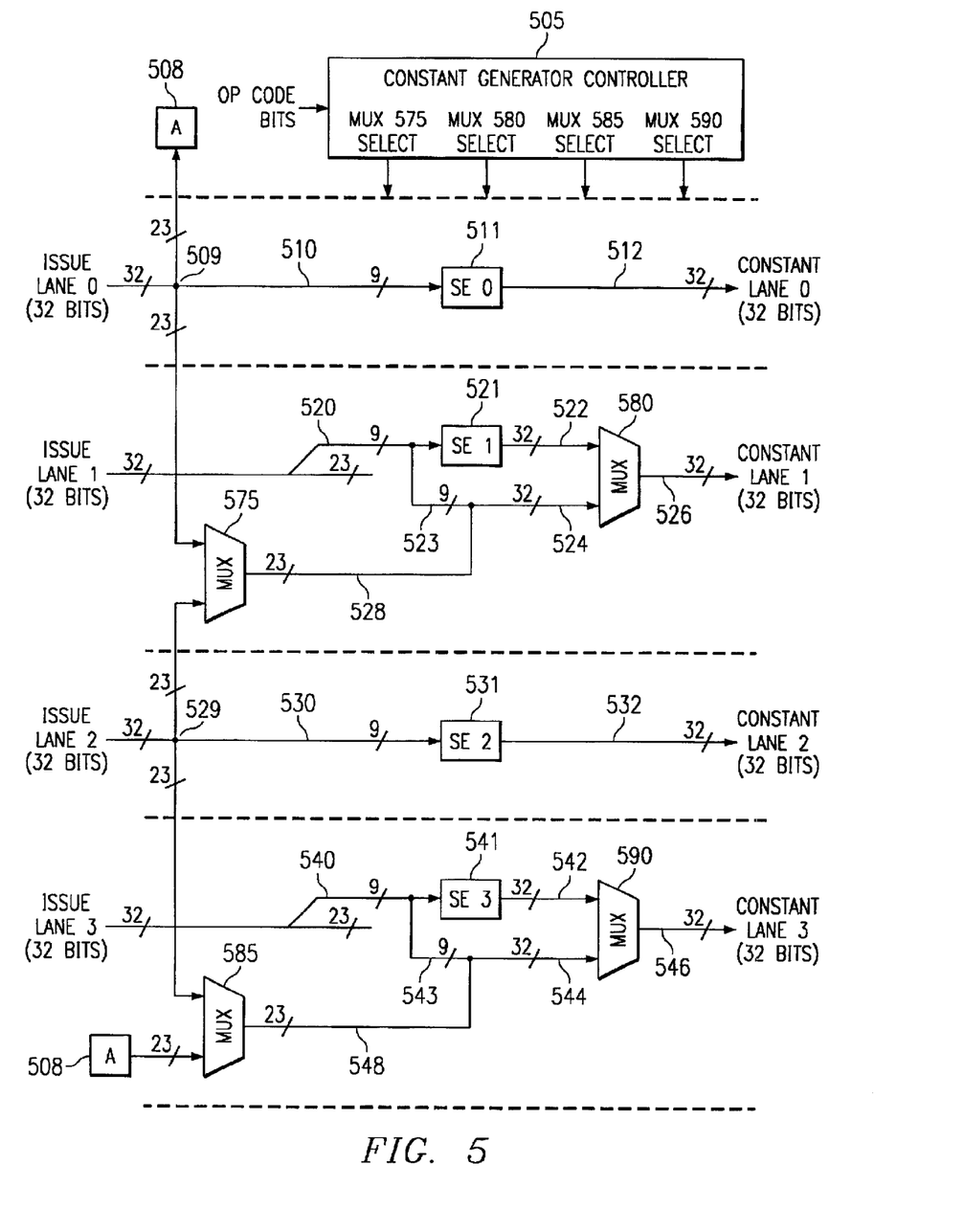
FIG. 5 illustrates a block diagram of a constant generator unit according to one advantageous embodiment of the present invention.
Figure 6:
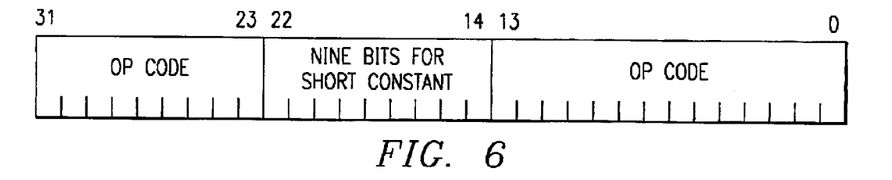
FIG. 6 illustrates a diagram of a thirty two bit computer syllable showing an original location of nine bits that represent a short constant operand to be encoded.
Figure 7:
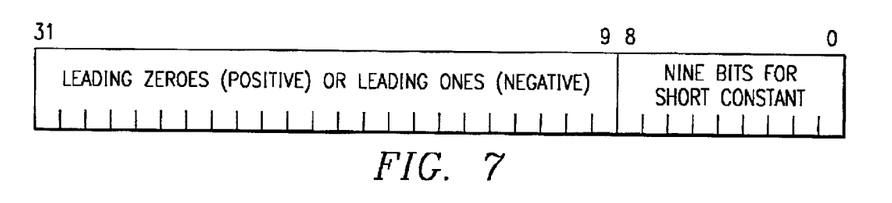
FIG. 7 illustrates a diagram of a thirty two bit computer syllable showing the right justification of nine bits that represent a short constant operand to be encoded.
Figure 8:
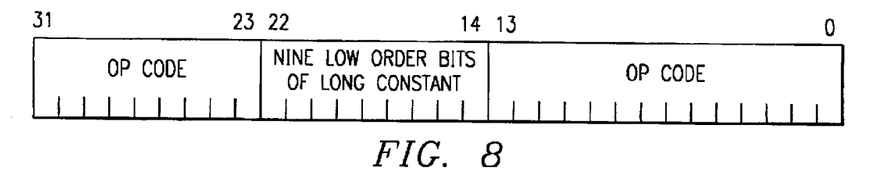
FIG. 8 illustrates a diagram of a thirty two bit computer syllable showing an original location of nine low order bits of a long constant operand to be encoded.

FIG. 5 is a block diagram illustrating a constant generator unit 500 according to one embodiment of the present invention. Constant generator unit 500 is capable of generating constants having a short constant data size and constants having a long constant data size.

In the illustrated embodiment, constant generator unit 500 comprises constant generator controller 505. Constant generator controller 505 receives op code bits from the input syllables that appear on Issue Lane 0, Issue Lane 1, Issue Lane 2, and Issue Lane 3. Constant generator controller 505 controls (i.e., enables and disables the operation of) multiplexer 575, multiplexer 580, multiplexer 585, and multiplexer 590. As will be more fully described, additional elements of constant generator unit 500 are located within Issue Lane 0, and within Issue Lane 1, and within Issue Lane 2, and within Issue Lane 3.

The input data path of Issue Lane 0 receives thirty two (32) bits. In constant generator unit 500 Issue Lane 0 comprises input data path 510, sign extender unit 511 (SE 0), and data path 512. The output of constant generator unit 500 on Issue Lane 0 comprises thirty two (32) output bits on data path 512. The output of constant generator unit 500 on data path 512 is referred to as Constant Lane 0.

The input data path of Issue Lane 2 also receives thirty two (32) bits. In constant generator unit 500 Issue Lane 2 comprises input data path 530, sign extender unit 531 (SE 2), and data path 532. The output of constant generator unit 500 on Issue Lane 2 comprises thirty two (32) output bits on data path 532. The output of constant generator unit 500 on data path 532 is referred to as Constant Lane 2.

The input data path of Issue Lane 1 also receives thirty two (32) bits. In constant generator unit 500 Issue Lane 1 comprises two data paths. A first data path of Issue Lane 1 comprises data path 520, sign extender unit 521 (SE1), data path 522, multiplexer 580, and data path 526. A second data path of Issue Lane 1 comprises data path 520, data path 523, data path 524, multiplexer 580, and data path 526. As will be more fully described, data path 524 comprises data path 523 and data path 528 from multiplexer 575. The output of constant generator unit 500 on Issue Lane 1 comprises thirty two (32) output bits on data path 526. The output of constant generator unit 500 on path 526 is referred to as Constant Lane 1.

The input data path of Issue Lane 3 also receives thirty two (32) bits. In constant generator unit 500 Issue Lane 3 comprises two data paths. A first data path of Issue Lane 3 comprises data path 540, sign extender unit 541 (SE3), data path 542, multiplexer 590, and data path 546. A second data path of Issue Lane 3 comprises data path 540, data path 543, data path 544, multiplexer 590, and data path 546. As will be more fully described, data path 544 comprises data path 543 and data path 548 from multiplexer 585. The output of constant generator unit 500 on Issue Lane 3 comprises thirty two (32) output bits on data path 546. The output of constant generator unit 500 on data path 546 is referred to as Constant Lane 3.

For the purpose of providing a specific example of the operation of constant generator unit 500 assume that a bundle consists of four syllables that are issued on Issue Lane 0, Issue Lane 1, Issue Lane 2, and Issue Lane 3. Every syllable of a bundle has a designated field for encoding short constant data. It is not required that every operation use the designated field for constant data or that the field be reserved for the exclusive use of constant data.

Encoding Short Constant Operands

The designated field for encoding short constant data will contain a selected number of bits. The selected number of bits in the designated field will be designated by the letter K where K represents a positive integer number. For example, the value K could be selected to be the integer nine (9). FIG. 5 illustrates constant generator unit 500 in which the value K is selected to be the integer nine (9).

For example, consider a thirty two (32) bit syllable that is input on Issue Lane 0. In the illustrative example shown in FIG. 6, bits 14 through 22 comprise a nine (9) bit short constant field. The remaining bits in the thirty two (32) bit syllable are op code bits. Op code bits define an operation (e.g., addition) that uses the nine (9) short constant bits.

Data path 510 consisting of nine (9) lines extends from node 509 to sign extender unit 511 (SE 0). Sign extender unit 511 (SE 0) moves the nine (9) short constant data bits from their previous location in the thirty two (32) bit input syllable to the nine (9) least significant bits (i.e., bit 0 through bit 8) in the thirty two (32) bit output syllable on data path 512. For positive short constants, sign extender unit 511 (SE 0) changes the upper bits of the output syllable (i.e., bit 9 to bit 31) to zero (0). For negative short constants, sign extender unit 511 (SE 0) changes the upper bits of the output syllable (i.e., bit 9 to bit 31) to one (1). In this manner, sign extender unit 511 (SE 0) "right justifies" the nine (9) short constant data bits within the output syllable on data path 512 (Constant Lane 0). In the illustrative example shown in FIG. 7, bits 0 through 8 comprise the "right justified" short constant. Bits 9 through 31 are each set to "zero" when the short constant is positive and are each set to "one" when the short constant is negative.

For the remaining twenty three (23) bits in the input syllable on Issue Lane 0, a first twenty three (23) line data path extends from node 509 to a first input of multiplexer 575. In addition, a second twenty three (23) line data path extends from node 509 to node 508 (node A) and then to a first input of multiplexer 585. The significance and operation of these data paths will be described more fully below.

Constant generator unit 500 comprises a similar structure in Issue Lane 2. Data path 530 consisting of nine (9) lines extends from node 529 to sign extender unit 531 (SE 2). Sign extender unit 531 (SE 2) moves the nine (9) short constant data bits from their previous location in the thirty two (32) bit input syllable to the nine (9) least significant bits (i.e., bit 0 through bit 8) in the thirty two (32) bit output syllable on data path 532. For positive short constants, sign extender unit 531 (SE 2) changes the upper bits of the output syllable (i.e., bit 9 to bit 31) to zero (0). For negative short constants, sign extender unit 531 (SE 2) changes the upper bits of the output syllable (i.e., bit 9 to bit 31) to one (1). In this manner, sign extender unit 531 (SE 2) "right justifies" the nine (9) short constant data bits within the output syllable on data path 532 (Constant Lane 2).

For the remaining twenty three (23) bits in the input syllable on Issue Lane 2, a first twenty three (23) line data path extends from node 529 to a second input of multiplexer 575. In addition, a second twenty three (23) line data path extends from node 529 to a second input of multiplexer 585. As before, the significance and operation on these data paths will be described more fully below.

Constant generator unit 500 comprises a similar structure in Issue Lane 1. Data path 520 carries the nine (9) short constant data bits to sign extender unit 521 (SE 1). Sign extender unit 521 (SE 1) moves the nine (9) short constant data bits from their previous location in the thirty two (32) bit input syllable to the nine (9) least significant bits (i.e., bit 0 through bit 8) in the thirty two (32) bit output syllable on data path 522. For positive short constants, sign extender unit 521 (SE 1) changes the upper bits of the output syllable (i.e., bit 9 to bit 31) to zero (0). For negative short constants, sign extender unit 521 (SE 1) changes the upper bits of the output syllable (i.e., bit 9 to bit 31) to one (1). In this manner, sign extender unit 521 (SE 1) "right justifies" the nine (9) short constant data bits within the output syllable on data path 522.

When a short constant operand appears in an input syllable on Issue Lane 1, constant generator controller 505 causes multiplexer 580 to pass the data on data path 522 to data path 526. Then the nine (9) short constant data bits appear right justified in the output syllable on data path 526 (Constant Lane 1).

The additional elements of constant generator unit 500 located within Issue Lane 1 are used to encode long constant operands. The operation of these additional elements will be discussed later in this document.

Constant generator unit 500 comprises a similar structure in Issue Lane 3. Data path 540 carries the nine (9) short constant data bits to sign extender unit 541 (SE 3). Sign extender unit 541 (SE 3) moves the nine (9) short constant data bits from their previous location in the thirty two (32) bit input syllable to the nine (9) least significant bits (i.e., bit 0 through bit 8) in the thirty two (32) bit output syllable on data path 542. For positive short constants, sign extender unit 541 (SE 3) changes the upper bits of the output syllable (i.e., bit 9 to bit 31) to zero (0). For negative short constants, sign extender unit 541 (SE 3) changes the upper bits of the output syllable (i.e., bit 9 to bit 31) to one (1). In this manner, sign extender unit 541 (SE 3) "right justifies" the nine (9) short constant data bits within the output syllable on data path 542.

When a short constant operand appears in an input syllable on Issue Lane 3, constant generator controller 505 causes multiplexer 590 to pass the data on data path 542 to data path 546. Then the nine (9) short constant data bits appear right justified in the output syllable on data path 546 (Constant Lane 3).

The additional elements of constant generator unit 500 located within Issue Lane 3 are used to encode long constant operands. The operation of these additional elements will be discussed later in this document.

Therefore, a short constant operand may be encoded on Issue Lane 0, or on Issue Lane 1, or on Issue Lane 2, or on Issue Lane 3. Although the example showed a short constant operand of nine (9) bits, the principle of the present invention may be used with any selected number of bits (K).

Encoding Long Constant Operands

In order to encode long constant operands, the present invention employs at least two instruction syllables. The first instruction syllable is similar to the instruction syllable discussed above in connection with the encoding of short constant operands. In the first instruction syllable K bits contain the least significant bits (i.e., the low order bits) of the long constant to be encoded. In the illustrative example shown in FIG. 8, these K bits comprise nine (9) bits (i.e., bits 14 through 22). The remaining bits in the thirty two (32) bit syllable are op code bits. Op code bits define an operation (e.g., addition) that uses the K low order bits of the long constant. Therefore, the first instruction syllable comprises op code bits and K low order bits.

The second instruction syllable is sometimes referred to as an "extension" syllable. The extension syllable contains T additional bits that comprise the most significant bits of the long constant operand to be encoded. The K bits of the first instruction syllable and the T bits of the extension syllable may be combined to obtain (k+T) bits of the long constant operand to be encoded.

Figure 9:
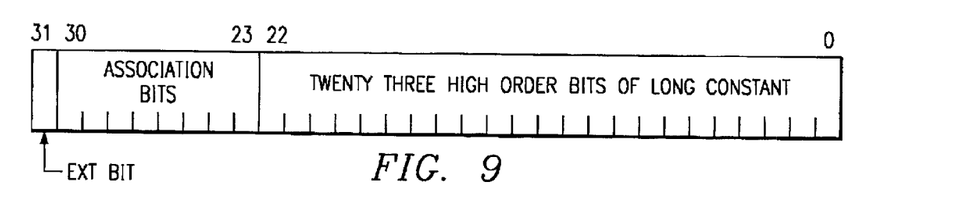
FIG. 9 illustrates a diagram of a thirty two bit computer syllable showing an extension syllable that contains twenty three high order bits of a long constant operand to be encoded.

For example, if the K value is nine (9) and the T value is twenty three (23), then the (K+T) value will be thirty two (32). The long constant operand will then comprise a full thirty two (32) bit syllable. The advantageous embodiment of the present invention shown in FIG. 5 reflects the numerical choice of nine (9) for K and twenty three (23) for T. FIG. 9 illustrates an exemplary extension syllable that contains twenty three (23) high order bits of a long constant.

The advantageous embodiment of the present invention that will be described will use only one extension syllable. However, it is noted that other advantageous embodiments of the present invention may employ more than one extension syllable.

As shown in FIG. 9, in addition to the twenty three (23) most significant bits of the long constant operand, the extension syllable also contains a bit field, EXT. Bit field EXT indicates when the extension mode for long constant operands is or is not being employed. If the EXT bit is set equal to zero (0), then the extension mode is not in use. If the EXT bit is set equal to one (1), then the extension mode is in use.

The extension syllable also contains an association bit field that may be used to indicate when a particular data path in constant generator unit 500 is to be used. As will be more fully discussed, when the bits in the association bit field are set equal to a first preselected number (e.g., one zero (10)), then a "first data path" will be selected for use. When the association bits are set equal to a second preselected number (e.g., one one (11)), then a "second data path" will be selected for use.

In other advantageous embodiments, the extension syllable may contain other bit fields or op codes that contain other types of information or instructions, depending upon the particular embodiment of the invention that is used. For example, if two extension syllables are used, the association bit field in the first extension syllable may contain a preselected number that indicates 1) an op code and 2) the existence and location of a second extension syllable that contains additional information that is to be used in connection with the first extension syllable.

Similarly, if three extension syllables are used, the second extension syllable may contain an association bit field with a preselected number that indicates the existence and location of a third extension syllable that contains additional information that is to be used in connection with the first and second extension syllables.

In the advantageous embodiment of the present invention shown in FIG. 5, an extension syllable is input on Issue Lane and a first instruction syllable is input on Issue Lane 1. There are twenty three (23) bits in the extension syllable that represent the most significant bits of the long constant operand. These twenty three (23) bits are carried by the twenty three (23) line data path that extends from node 509 to a first input of multiplexer 575. When the EXT bit in the extension syllable is set equal to one, this means that a long constant operand is to be encoded. Constant generator controller 505 receives bit EXT as an op code bit. Constant generator controller 505 determines that the EXT bit is set equal to one and that a long constant is being encoded.

Constant generator controller 505 now enables multiplexer 575 to pass the data on one of the two inputs of multiplexer 575 to data path 528. In order to make the determination of which data input of multiplexer 575 to enable, constant generator controller 505 considers the status of the bits in the association bit field. As previously mentioned, when the bits in the association bit field are set equal to a first predetermined number (e.g., one zero (10)) then a "first data path" will be selected for use. When the bits in the association bit field are set equal to a second predetermined number (e.g., one one (11)), then a "second data path" will be selected for use. In this case, the bits in the association bit field are is set equal to "one zero" (10)), and the data on the first input of multiplexer 575 is to be selected. If the bits in the association bit field had been set equal to "one one" (11), it would have meant that the data on the second input of multiplexer 575 would have been selected. The data on the second input of multiplexer 575 comes from node 529 of Issue Lane 2.

In this manner, constant generator controller 505 causes multiplexer 575 to pass the data on the first input of multiplexer 575 to data path 528. Then the twenty three (23) most significant data bits of the long constant operand appear on data path 528.

At the same time, the first instruction syllable is input on Issue Lane 1. Data path 520 carries the nine (9) least significant data bits of the long constant operand to sign extender unit 521 (SE 1). However, the output of sign extender unit 521 (SE 1) is not selected by multiplexer 580 in this instance. Instead, the nine (9) least significant data bits of the long constant operand are carried by data path 523 to a juncture with data path 528. At this point, the twenty three (23) most significant data bits are combined with the nine (9) least significant data bits to form a thirty two (32) bit syllable that represents the long constant operand. These thirty two (32) bits are carried by data path 524 to a second input of multiplexer 580.

Figure 10:
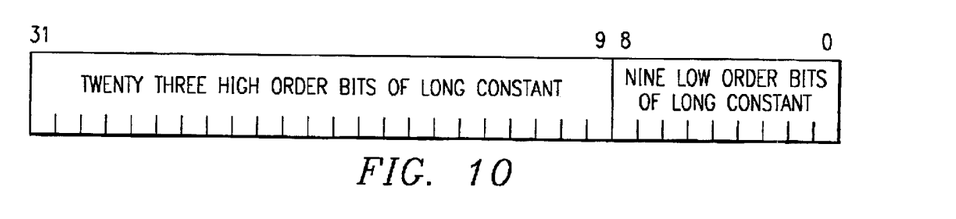
FIG. 10 illustrates a diagram of a thirty two bit computer syllable showing the combination of nine low order bits and twenty three high order bits of a long constant operand.

In the same manner that constant generator controller 505 selected the first input of multiplexer 575 based on the status of the bits in the association bit field, constant generator controller 505 selects the second input of multiplexer 580 based on the status of the EXT bit. Because the EXT bit is set equal to one (1), constant generator controller 505 selects the second input of multiplexer 580 and does not select the first input of multiplexer 580. Multiplexer 580 then outputs the thirty two (32) bit syllable that represents the long constant operand to data path 526. In this manner, the thirty two (32) bits for the long constant operand appear in the output syllable on data path 526 (Constant Lane 1). FIG. 10 illustrates an exemplary output syllable in which bits 0 through 8 contain the low order bits of the long constant operand and in which bits 9 through 31 contain the high order bits of the long constant operand.

The operation of encoding a long constant operand may also be carried out in Issue Lane 2 and Issue Lane 3. The extension syllable is provided as input to Issue Lane 2 and the first instruction syllable is provided as input to Issue Lane 3. The output of the thirty two (32) bits that represent the long constant operand will then appear in the output syllable on data path 546 (Constant Lane 3).

The advantageous embodiment of the present invention shown in FIG. 5 comprises two sets of issue lane pairs. The first set of issue lane pairs comprises Issue Lane 0 and Issue Lane 1. The second set of issue lane pairs comprises Issue Lane 2 and Issue Lane 3. It is understood that in alternate advantageous embodiment, the present invention may be practiced with only one set of issue lane pairs. It is also understood that in other advantageous embodiments, the present invention may be practiced with more than two sets of issue lane pairs.

Figures 11, 12:
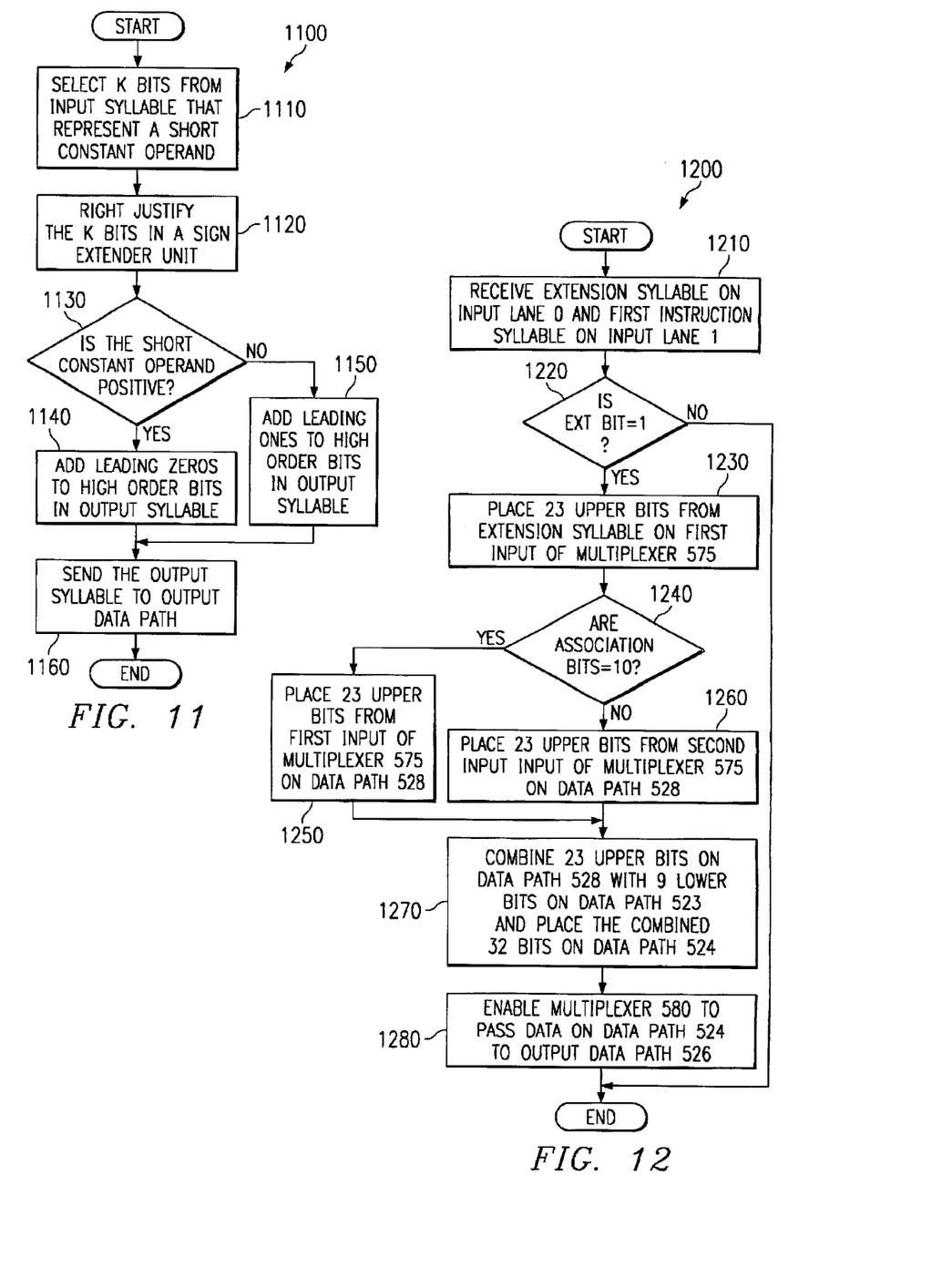
FIG. 11 illustrates a flow diagram describing the operation of an advantageous embodiment of the method of the present invention for encoding a short constant operand.
FIG. 12 illustrates a flow diagram describing the operation of an advantageous embodiment of the method of the present invention for encoding a long constant operand.

FIG. 11 illustrates flow diagram 1100 describing the operation of an advantageous embodiment of the method of the present invention for encoding a short constant operand. The steps set forth in flow diagram 1100 may be executed in Issue Lane 0, or in Issue Lane 1, or in Issue Lane 2, or in Issue Lane 3. As a specific example, consider an input syllable on Issue Lane 0. Constant generator unit 500 receives the input syllable on Issue Lane 0. Sign extender unit 511 (SE 0) selects the K bits from the input syllable that represent the short constant operand (step 1110).

Sign extender unit 511 (SE 0) then "right justifies" the K bits in the manner previously described (step 1120). Sign extender unit 511 (SE 0) then determined whether the K bits represent a positive or negative short constant operand (decision step 1130). If the short constant operand is positive, then sign extender unit 511 (SE 0) adds leading zeroes to the high order bits in the output syllable (step 1140). If the short constant operand is negative, then sign extender unit 511 (SE 0) adds leading ones to the high order bits in the output syllable (step 1150). Sign extender unit 511 (SE 0) then sends the output syllable to output data path 512 (step 1160). This method may also be carried out by sign extender unit 521 (SE 1) on Issue Lane 1, or by sign extender unit 531 (SE 2) on Issue Lane 2, or by sign extender unit 541 (SE 3) on Issue Lane 3.

FIG. 12 illustrates flow diagram 1200 describing the operation of an advantageous embodiment of the method of the present invention for encoding a long constant operand. The steps set forth in flow diagram 1200 may be executed in Issue Lane 0 and Issue Lane 1. The steps set forth in flow diagram 12100 may also be executed in Issue Lane 2 and Issue Lane 3.

Assume that a long constant operand is to be encoded using Issue Lane 0 and Issue Lane 1. Constant generator unit 500 receives an extension syllable on Issue Lane 0 and a first instruction syllable on Issue Lane 1 (step 1210). Constant generator controller 505 then tests the EXT bit to determine whether a long constant operand is being encoded (step 1220). If the EXT bit is equal to zero, then a long constant operand is not being encoded and the method ends. If the EXT bit is equal to one, then a long constant operand is being encoded. Control then passes to step 1230.

The method then places the twenty three (23) upper bits from the extension syllable on the first input of multiplexer 575 in the manner previously described (step 1230). Constant generator controller 505 then tests the bits in the association bit field to determine which input on multiplexer 575 will be enabled (step 1240). If the value of the bits in the association bit field is equal to "one zero" (10), then the twenty three (23) upper bits on the first input of multiplexer 575 will be enabled (step 1250). If the value of the bits is the association bit field is equal to "one one" (11), then the twenty three (23) upper bits on the second input of multiplexer 575 will be enabled (step 1260). In the example that was previously described, the value of the bits in the association bit field was set equal to "one zero" (10) and the first input of multiplexer 575 was enabled.

Constant generator unit 500 then combines the twenty three (23) upper bits on data path 528 with the nine (9) lower bits on data path 523 and places the combined thirty two (32) bits on data path 526 (step 1270). Constant generator controller 505 then enables the second input of multiplexer 580 to pass the data on data path 524 to the output data path 526 (step 1280).

In this example the number of the lower bits was nine (9) and the number of the upper bits was twenty three (23). However, it is clear that the principle of the present invention is not limited to those exemplary numbers. Other number could be chosen for use with the system and method of the present invention.

Although the present invention has been described in detail, those skilled in the art should understand that they can make various changes, substitutions and alterations herein without departing from the spirit and scope of the invention in its broadest form.

What is claimed is:

1. A data processor comprising:

an instruction execution pipeline comprising N processing stages;

an instruction issue unit capable of fetching into said instruction execution pipeline instructions fetched from an instruction cache associated with said data processor, each of said fetched instructions comprising from one to S syllables; and a constant generator unit capable of receiving said fetched instruction syllables and capable of generating at least one constant operand by:
  decoding at least one constant operand instruction comprising at least one syllable containing a K bit constant field containing K bits that represent at least part of a constant operand; and
  at least one of: right justifying the K bits to produce a short constant operand, and combining the K bits with T bits of data from a T bit constant field to produce a long constant operand 2. The data processor as set forth in claim 1 wherein said at least one syllable of said constant operand instruction contains at least one op code field that contains at least one op code.

3. The data processor as set forth in claim 1 wherein said constant generator unit comprises:

an input data path coupled to a sign extension unit, said input data path capable of providing to said sign extension unit the K bits of data within said at least one syllable, wherein said sign extension unit is capable of right justifying said K bits of data in an output syllable; and an output data path coupled to said sign extension unit capable of receiving from said sign extension unit said output syllable containing said right justified K bits of data that represent said short constant operand.

4. The data processor as set forth in claim 3 wherein said sign extension unit is capable of placing leading zeros in front of said right justified K bits when said short constant operand is positive.

5. The data processor as set forth in claim 3 wherein said sign extension unit is capable of placing leading ones in front of said right justified K bits when said short constant operand is negative.

6. The data processor as set forth in claim 3 wherein said constant operand instruction comprises at least one extension syllable containing a T bit constant field containing the T bits of data, the long constant operand comprising T high order bits and K low order bits.

7. The data processor as set forth in claim 6 wherein the value of K is nine and the value of T is twenty three.

8. The data processor as set forth in claim 6 wherein said at least one extension syllable further comprises an EXT bit field containing an EXT bit for determining whether said constant operand instruction is to decode a long constant operand.

9. The data processor as set forth in claim 6 wherein said at least one extension syllable further comprises an association bit field containing bits for determining which of two data paths to select to obtain T bits that represent the high order bits of said long constant operand.

10. The data processor as set forth in claim 6 wherein said constant generator unit comprises:
   a first data path capable of receiving from said at least one extension syllable T bits of data that represent the high order bits of a long constant operand;
   a second data path capable of receiving from said at least one constant operand instruction the K bits of data that represent the low order bits of said long constant operand; and
   a third data path capable of receiving said T bits of data from said first data path and capable of receiving said K bits of data from said second data path and capable of combining said T bits of data and said K bits of data to provide a representation of said long constant operand.

11. The data processor as set forth in claim 10 wherein the value of K is nine and the value of T is twenty three.

12. The data processor as set forth in claim 1 wherein said constant generator unit comprises:
   a multiplexer having a first input capable of receiving from an extension syllable from a first issue lane T bits of data that represent the high order bits of a long constant operand;
   said multiplexer having a second input capable of receiving from an extension syllable from a second issue lane T bits of data that represent the high order bits of a long constant operand;
   said multiplexer coupled to an output data path and capable of sending to said output data path one of said T bits of data from said first issue lane and said T bits of data from said second issue lane; and
   a constant generator controller coupled to said multiplexer, said constant generator controller capable of enabling said first input of said multiplexer when bits in an association bit field in said extension syllable are set equal to a first predetermined number, and said constant generator controller capable of enabling said second input of said multiplexer when said bits in said association bit field in said extension syllable are set equal to a second predetermined number.

13. The data processor as set forth in claim 1 wherein said constant generator unit comprises:
   a first input data path couple to a sign extension unit, said input data path capable of providing to said sign extension unit K bits of data that represent one of:
   1) the bits of a short constant operand, and
   2) the low order bits of a long constant operand;
   wherein said sign extension unit is capable of right justifying said K bits of data in an output syllable;
   a multiplexer having a first input coupled to the output of said sign extension unit and capable of receiving from said sign extension unit said output syllable containing said right justified K bits of data;
   said multiplexer having a second input capable of receiving a combination of K bits of data and T bits of data, where said K bits of data are the low order bits of a long constant operand and where said T bits of data are the high order bits of said long constant operand; and
   a constant generator controller coupled to said multiplexer, said constant generator controller capable of enabling said first input of said multiplexer when an EXT bit in said extension syllable is set equal to zero, and said constant generator controller capable of enabling said second input of said multiplexer when said EXT bit in said extension syllable is set equal to one.

14. The data processor as set forth in claim 13 wherein the value of K is nine and the value of T is twenty three.

15. For use in a data processor comprising an instruction execution pipeline comprising N processing stages, a method of encoding a short constant operand comprising the steps of:
   receiving in a sign extender unit an input syllable that contains a K bit field containing K bits that represent a short constant operand;
   selecting said K bits from said input syllable;
   right justifying said K bits in an output syllable; and
   sending said output syllable to an output data path.

16. The method as set forth in claim 15 further comprising the steps of:
   determining that said K bits represent a positive short constant operand; and
   placing leading zeroes in the high order bits of said output syllable.

17. The method as set forth in claim 15 further comprising the steps of:
   determining that said K bits represent a negative short constant operand; and
   placing leading ones in the high order bits of said output syllable.

18. For use in a data processor comprising an instruction execution pipeline comprising N processing stages, a method of encoding a long constant operand comprising the steps of:
   receiving an extension syllable from a first input lane, where said extension syllable contains a T bit field containing T bits that represent the high order bits of said long constant operand;
   receiving a first instruction syllable from a second input lane, where said first instruction syllable contains a K bit field containing K bits that represent the low order bits of said long constant operand;
   placing said K bits on a first data path;
   placing said T bits on a second data path;
   combining said K bits and said T bits on a third data path where the combination of said K bits and said T bits represent said long constant operand.

19. The method as claimed in claim 18 wherein the value of K is nine and the value of T is twenty three.

20. A method as claimed in claim 18 further comprising the steps of:

coupling to a first input of a multiplexer a first set of T bits that represent the high order bits of said long constant operand;

coupling to a second input of said multiplexer a second set of T bits that represent the high order bits of said long constant operand;

enabling the first input of said multiplexer with a constant generator controller when an EXT bit in said extension syllable is set equal to zero;

enabling the second input of said multiplexer with said constant generator controller when said EXT bit is said extension syllable is set equal to one; and placing the enabled set of T bits on said second data path.

* * * * *